United States Patent
Eubanks et al.

(10) Patent No.: US 7,882,944 B1
(45) Date of Patent: Feb. 8, 2011

(54) DRIVE BELT GUARD FOR A ROLLER CONVEYOR

(75) Inventors: Ronald L. Eubanks, Erlanger, KY (US); John Erwin Treft, Fairfield, OH (US)

(73) Assignee: TKF, Inc., Cincinnati, OH (US)

( * ) Notice: Subject to any disclaimer, the term of this patent is extended or adjusted under 35 U.S.C. 154(b) by 96 days.

(21) Appl. No.: 12/352,105

(22) Filed: Jan. 12, 2009

(51) Int. Cl.
*B65G 13/07* (2006.01)
*B65G 21/00* (2006.01)

(52) U.S. Cl. .................................... 198/790; 198/860.3

(58) Field of Classification Search ............. 198/790, 198/860.3, 781.03, 781.09, 781.1, 781.11
See application file for complete search history.

(56) References Cited

U.S. PATENT DOCUMENTS

| | | | |
|---|---|---|---|
| 4,895,247 A * | 1/1990 | Marchetti | 198/790 |
| 4,919,256 A * | 4/1990 | Gebhardt | 198/781.08 |
| 5,105,935 A * | 4/1992 | Kohl | 198/781.08 |
| 5,348,140 A | 9/1994 | Clos | |
| 6,223,888 B1 * | 5/2001 | Jahns | 198/781.03 |
| 6,318,545 B1 * | 11/2001 | Ross, II | 198/860.3 |
| 6,516,940 B1 * | 2/2003 | Hart et al. | 198/781.1 |
| 7,306,091 B2 | 12/2007 | Eubanks et al. | |
| 7,530,452 B2 | 5/2009 | Vestergaard | |
| 2008/0277247 A1 | 11/2008 | Eubanks et al. | |

OTHER PUBLICATIONS

U.S. Appl. No. 11/268,335, filed Nov. 7, 2005, Eubanks et al.

* cited by examiner

*Primary Examiner*—Mark A Deuble
(74) *Attorney, Agent, or Firm*—Hasse & Nesbitt LLC; Daniel F. Nesbitt

(57) ABSTRACT

A belt guard for a drive belt on a roller conveyor system, that can be positioned adjacent the drive belt and between adjacent conveyor rollers to guard the side edges of the drive belt from inadvertent or intentional entanglement of a person's fingers or other body parts or clothing in the rotating rollers and drive belts. A guard assembly is provided having a first and second belt guard members affixed together and disposed on opposite sides of the drive belt. The invention also includes a roller conveying system that has a plurality of the spaced-apart cylindrical rollers, driven by a plurality of a circular drive belt, and a nip guard system having a plurality of nip guard means that guard the nips and/or sides of the revolving drive belts.

19 Claims, 8 Drawing Sheets

US 7,882,944 B1

DRIVE BELT GUARD FOR A ROLLER CONVEYOR

CROSS-REFERENCE TO RELATED APPLICATION

This application claims the benefit of U.S. Provisional Application No. 60/020,154, filed Jan. 10, 2008.

BACKGROUND OF THE INVENTION

Conveyor roller systems are used by the manufacturing and transport, as well as other, industries in the movement of goods. Improvements have been made in conveyor systems, such as the system shown in U.S. Pat. No. 5,348,140, issued to Clos, that shows a roller having a splined drive that is engaged by a ribbed drive belt, and as shown in U.S. Pat. No. 5,348,140, having powered rollers that use drive belts between adjacent rollers to transmit power from a driven roller to one or more adjacent rollers. Such roller systems have helped to reduce the cost and complexity in construction of such conveying systems.

While roller conveyor systems that use drive belts between rollers have provided provide improvements, there remains a need to improve the means of protecting persons and articles from becoming entangled in the rotating rollers and belts of the system. Safety standards require that rotating equipment that can expose a person's body or clothing to becoming entangled in the rotating features, must be provided with a means of guarding or preventing a person's body or clothing from coming between such rotating rollers and their belts. This has traditionally been accomplished by building a housing over that drive portion of the conveyor rollers. This reduces the area available on the surface of the roller conveyors for transporting articles, and adds to the complexity and cost of designing and installing such conveyor systems.

There remains a need for an improved means for protecting persons and their clothing from becoming entangled in the rotating rollers and drive belts of roller conveyor systems.

SUMMARY OF THE INVENTION

The present invention provides a nip guard means that can be disposed adjacent a drive belt or a nip area of the drive belt with the drive portion of a roller, to minimize or prevent exogenous objects, including clothing and parts of the human body, such as fingers and hair, from being drawn into the nip area. The nip guard means is a safety feature that helps to prevent a person's finger or clothing from becoming pulled into the drive belt and the drive portion of the roller assembly.

The present invention relates to a belt guard for a drive belt that is in driving contact between a pair of adjacent, rotating cylindrical conveyor rollers, the guard including an upper edge and opposed first and second ends, each first and second end having a concave portion configured for interference-free confronting orientation with a drive portion of each of the rotating conveyor rollers.

The present invention also relates to a belt guard assembly for a drive belt that is in driving contact between a pair of adjacent cylindrical conveyor rollers, comprising the first belt guard disposed on a first side of the drive belt, and a second belt guard affixed to the first belt guard and disposed on the opposed second side of the drive belt.

The present invention further relates to a roller conveying system comprising: a plurality of spaced-apart cylindrical rollers, each roller having a tubular conveying portion having a first radius, and at least one drive portion having an outermost surface of a second radius smaller than the first radius, and wherein the upper peripheries of the conveying portions of adjacent rollers form a conveying surface; a plurality of drive belts, each belt in driving contact with the drive portions of a pair of adjacent, rotatable rollers to define a first nip area and a second nip area; and a plurality of nip guards means, each nip guard means positioned proximate at least one of the first nip area and second nip area, and configured so that no part of the belt guard extends above the conveying surface proximate the drive portions of the pair of adjacent rollers.

The present invention also relates to a nip guard system for use in a roller conveying system that includes a plurality of spaced-apart rotating cylindrical rollers, and comprising a pair of adjacent rollers, each roller having a conveying portion having a periphery defined by a first radius, and at least one drive portion having an outermost surface of a second radius less than the first radius, and wherein an upper portion of the peripheries of the conveying portions of the pair of adjacent rollers forms a conveying surface; and a plurality of drive belts, each of the plurality of drive belts in driving contact with the drive portions of the pair of adjacent rollers and forming a nip where the drive belt advances onto the drive portion, the belt guard system comprising a plurality of nip guard means that obstruct access by an exogenous object to the plurality of nips.

The present invention also relates to a method of guarding the side edges of a drive belt that operates between two adjacent conveyor rollers of a roller conveyor, comprising the steps of: 1) providing a roller conveyor comprising a plurality of spaced-apart rollers, each roller having a drive portion, and a plurality of drive belts, each belt having an upper strand engaging the drive portion of a pair of adjacent rollers; and positioning a belt guard at a side of the drive belt, the guard being positioned proximate the upper strand of the drive belt.

The method of the invention also relates to the use of any of the belt guard devices described herein on a belt-drive roller conveyor, as described herein.

The above and other aspects and advantages of the present invention are made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Definitions

The term "nip" herein refers to the area at the sides and along the inside portion of a drive belt that engages a drive portion of a conveyor roller, including both the area where the belt is advancing onto a drive portion of a roller, and the area where the belt is moving off of a drive portion of a roller.

The term "interference-free" means a dynamic condition where a belt guard or other nip guard means can be positioned in confronting orientation with a drive portion of a rotating conveyor roller without significantly interfering with the rotation and the rotating speed of the conveyor roller, and with the drive belts and its engagement with the drive portion of the conveyor roller.

The present invention provides a nip guard means, provided in one embodiment as a belt guard device, for a drive belt on a roller conveyor system, that can be positioned adjacent the drive belt and between adjacent conveyor rollers to guard the nip area and/or the side edges of the drive belt from inadvertent or intentional entanglement of a person's fingers or other body part or clothing, with the rotating rollers and drive belts. The belt guard is configured to avoid a portion or element thereof extending above the conveying surface proximate the drive portions of the rollers.

Figure 1:
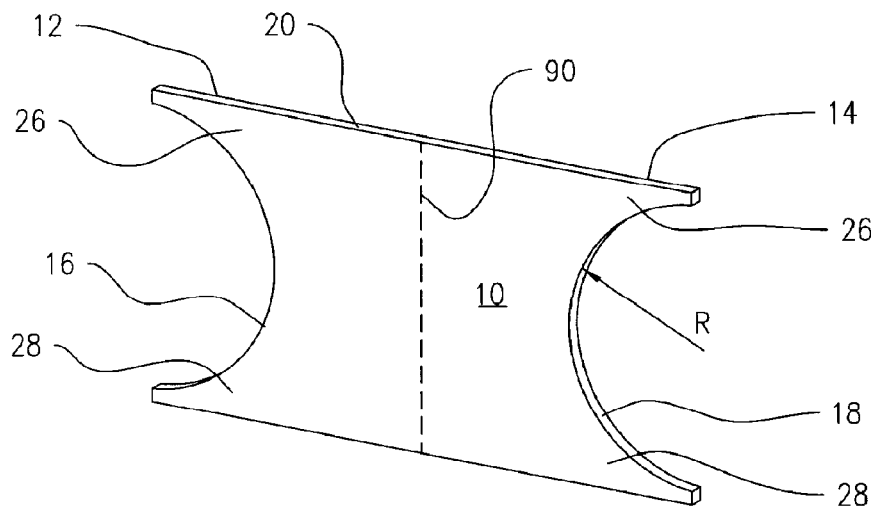
FIG. 1 is a perspective view of a first embodiment of a nip guard means of the present invention, shown as a belt guard device.
Figure 2:
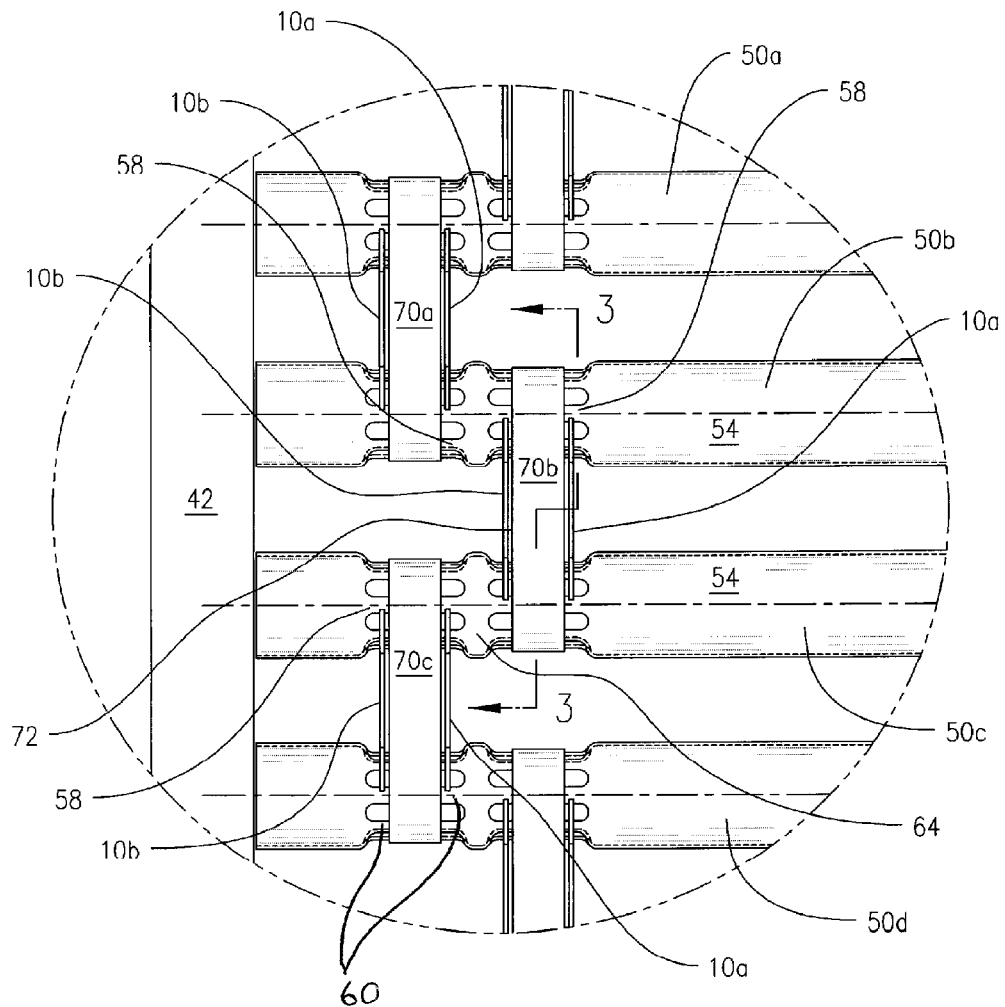
FIG. 2 is a plan view of an embodiment of a roller conveying system of the present invention, having spaced-apart cylindrical rollers driven by belts, and a plurality of the belt guard devices.

FIGS. 1 and 2 show a first embodiment of a belt guard device 10 for protecting the sides of a belt revolving between adjacent rollers of a belt-driven roller conveyor system. The device is also protecting the nip area of the belt with the drive portions of the rollers. The belt guard 10 is typically formed from a planar sheet of a material. The guard 10 has opposed ends 12 and 14, each configured with a concave portion 16 and 18, respectively. The ends 12 and 14 are configured for positioning between and receiving adjacent rollers of the roller conveyor assembly. Since such rollers are typically tubular and cylindrical, the concave portions 16 and 18 are typically circular, having an arc radius (R) that approximates the radius of the roller. The radius R is typically as large as and more typically slightly larger than, the outermost arc radius (R) of the drive portion of the roller (see FIG. 3) that is engaged by the drive belt. Each guard end 12 and 14 is shown with an upper arm 26 on opposite ends 12 and 14 of the concave portion, which has an upper edge that extends outwardly along the upper edge 20 of the belt guard. A pair of lower arms 28 extend outwardly along the opposed lower end of the guard.

Figure 3:
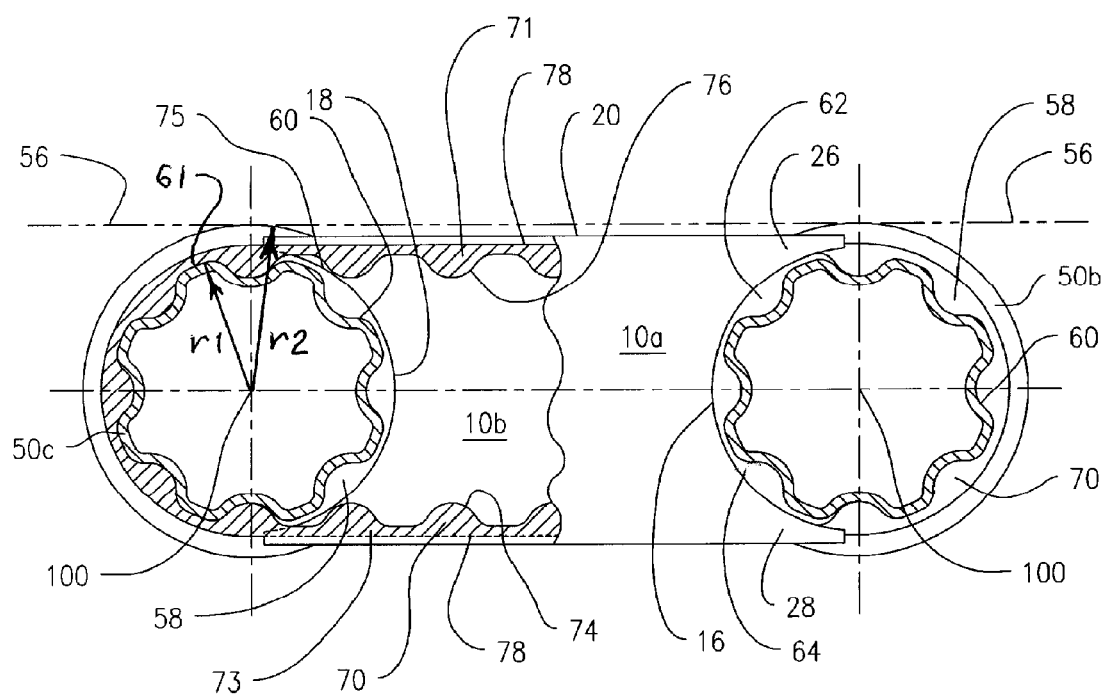
FIG. 3 is a cross sectional elevation view of the conveyor rollers through line 3-3 of FIG. 2, showing the drive belt and the belt guard device of FIG. 1.

The upper edge 20 of the guard 10 spans between the two ends 12 and 14. Typically, upper edge 20 is linear, but can be slightly curvilinear. As shown in FIG. 3, the upper edge 20 is configured to be disposed close to the conveying surface 56 between adjacent rollers 50b and 50c, and does not extend vertically above the conveying surface 56. The guards 10a and 10b are positioned between the rollers so that the concave portions 16 and 18 register with, pattern or confront a circumferential drive portion 58 of the adjacent rollers. The drive portion 58 in FIGS. 2 and 3 is shown as a splined portion that accepts and drives a similarly configured drive belt 70 as described herein. However, the drive portion can also be a smooth, recessed cylindrical portion that accommodates a drive belt having a smooth inner surface.

The arms 26 and 28 at each end of the upper edge 20 and lower edge, respectively, extend along the length of the belt 70 proximate the nip area 75 where the belt 70 engages the drive portion 58 of the roller. The distal ends of the arms 26 and 28 are typically rounded or blunted to avoid snagging inadvertently an object being conveyed on the conveying surface 56 of the rollers. The arms 26 and 28 serve to position the belt guard 10 by registering with and contacting with the roller 50 to maintain its position in registry with the roller. The arms also block access to the nip area where the belt guard engages the roller, to help prevent a finger or other object from becoming drawn into the nip. The positioning of the upper edge 20 of the belt guard 10 proximate the outer surface 78 of the belt 70 is achieved by sizing the height of the upper arms 26 according to the cross-sectional thickness of the drive belt 70.

As shown in FIGS. 2 and 3, the belt guard 10 is typically positioned adjacent to a side of the drive belt 70. The footprint or shape of the belt guard 10 is configured to cover at least the top strand 71, and, as shown and optionally, the bottom strand 73 of the drive belt 70, that span between the drive portions of the adjacent rollers. While a guard 10a is shown disposed adjacent each side of a drive belt 70, the invention can include a conveying system where a guard is disposed on only one side of a drive belt.

A typical roller conveyor system is described in U.S. Pat. No. 5,348,140, issued to Clos, and incorporated herein by reference. FIGS. 2 and 3 also illustrate a conveyor roller system for transporting articles across the conveying surface 56 of a plurality of rollers 50. The articles transported can be, for example, manufactured goods or containers for holding manufactured goods. The conveyor roller system comprises a plurality of tubular, cylindrical rollers 50 in spaced-apart adjacency, between parallel frame members 42 disposed on opposed ends of each roller to support and hold the rollers in place. A belt guard 10 is positioned on both sides of belt 70a, as well as on both sides of the adjacent and successive belts 70b and 70c.

The series of belts 70a, 70b and 70c couple together pairs of adjacent rollers 50a and 50b, 50b and 50c, and 50c and 50d, respectively. Advantageously, belts 70 can be formed of an elastomeric material such as rubber, neoprene, or the like; a nylon; or of a composite material such as a reinforced rubber, neoprene, nylon, or the like. Belts formed from an elastomeric or composite material are commercially available and are preferred over a metal link chain since elastomeric belts are quieter and generally allow for much higher conveyor speeds. Moreover, elastomeric or composite belts facilitate conveyor roller system assembly in that belts 70 can be positioned around successive pairs of rollers 50 prior to their positioning between the parallel frame members 42. In the illustrated embodiment, each belt 70 has an inner surface 76 having a succession of parallel, lateral projections or ribs 74, for engaging recessed splines 60 of rollers 50. The recessed splines can be formed into the tubular roller by well known means, such as when using a crimping die, configured in two or more die parts, that has a plurality of slot-shaped teeth projecting inwardly. Alternatively, tensioning of belt 70 between a pair of splined rollers could create sufficient grip so that a belt with a smooth inner surface 76 could be used.

Figures 9, 10:
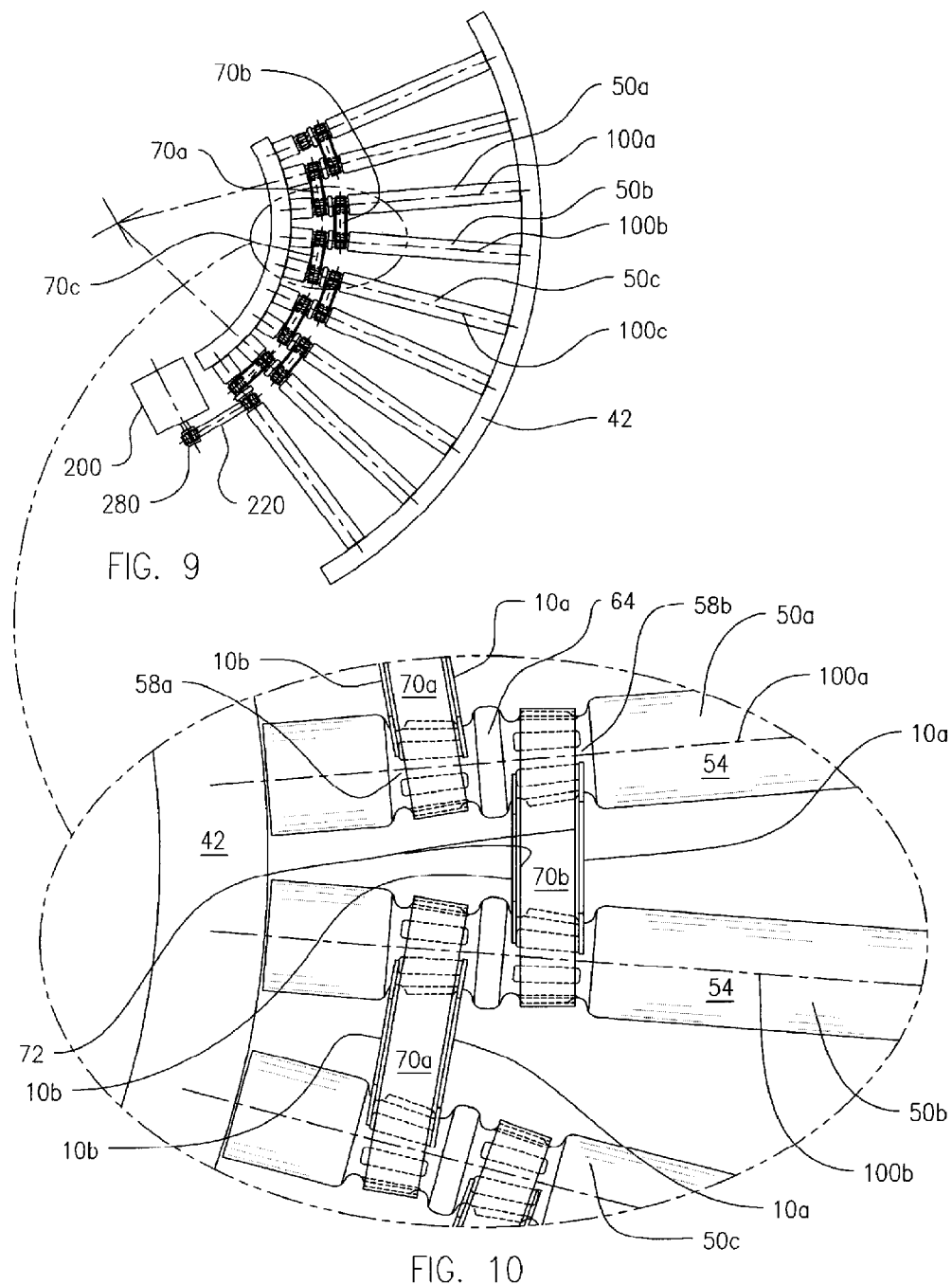
FIG. 9 is a plan view of another embodiment of a curved roller conveying system, having spaced-apart cylindrical rollers driven by belts, and a plurality of the belt guard devices of FIG. 1.
FIG. 10 is an exploded view of the curved roller conveyor of FIG. 9 showing the drive belts and the plurality of belt guard devices of FIG. 1.

The distance provided between rollers 50 generally is a function of the geometry of the articles or article carriers to be transported across conveying portions 54 of rollers 50. That is, the spacing between rollers 50 can be selected as effective to transport articles or article carriers across conveying portions 54 when rollers 50 are rotated. Consequently, the length of the belt guards 10 can be configured to conform to the roller spacing of any roller conveyor system. Power to rotate rollers 50 can be supplied by a drive motor coupled to at least one of the rollers. FIG. 9 shows a curved roller conveyor that employs a drive means 200 (such as a motor and gear box) to drive the rollers. It can be understood that the parallel rollers of FIG. 2 can be driven by a similar drive means. The power-transmitting coupling between drive motor 200 and driven roller can be effected by means of a drive belt, 220. Preferably, drive belt 220 has on an inner surface having a succession of parallel, lateral projections that engage recessed splines 60 of a roller. Advantageously, drive motor 200 can be provided with a drive shaft 280 also having a plurality of integrally-formed, radially-disposed recessed splines configured to receive the lateral projections of drive belt 220. Alternatively, a gearbelt pulley of a standard design can be mounted onto drive shaft 280 for powering drive belt 220.

The drive portion 58 can be formed proximate an end of the conveying rollers 50, or can be positioned intermediate the ends. FIGS. 2 and 3 show that the outermost surface 61 of the splines 60, representing the outermost surface of the drive portions, are configured to be recessed (to a radius r1 from the axis 100) sufficiently below the transfer surface 56 of the rollers (at a radius r2 from the axis 100) to accommodate a drive belt 70 such that the outer surface 78 of the belt 70 is also recessed below the conveying surface 56. The use of recessed splines 60 intermediate the ends of the conveyor rollers 70 facilitates conveying articles or article carriers directly over top of the outer surface 78 of belt 70 that is sized accordingly.

In FIG. 2, a non-splined portion 64 is shown between adjacent splined drive portions 58 on the same roller 50c, disposed between adjacent drive belts 70b and 70c. The non-splined portion 64 has a larger diameter that can help guide the positioning of the drive belts 70. Alternative embodiments of the invention can employ a single splined portion on a roller, without an intermediate non-splined portion 64, that provides a single drive portion 58 for adjacent drive belts 70 that drive adjacent rollers on opposite ends.

In this embodiment of the conveying system, the belt guard 10 can be loosely disposed in position adjacent the belt 70 and is unattached to the rollers or the conveyor. The guard 10 is free to move slightly in various directions, though it is confined in its general position from movement end-to-end and up-and-down by engagement of the arms 26 and 28 of the guard with the drive portions 58 of the adjacent rollers, and from movement normal to the plane of the guard by the drive belt 70 and by the non-splined portion 64 or conveying portion 54 of the roller.

In an alternative embodiment of the belt guard device 10, the belt guard can have a line of bending or flexure 90 intermediate the ends, at which the device can be folded or flexed to assist in its placement between adjacent rollers. The sheet material of the device has sufficient material memory to return to the planar form after the folding forces are released.

Figure 5:
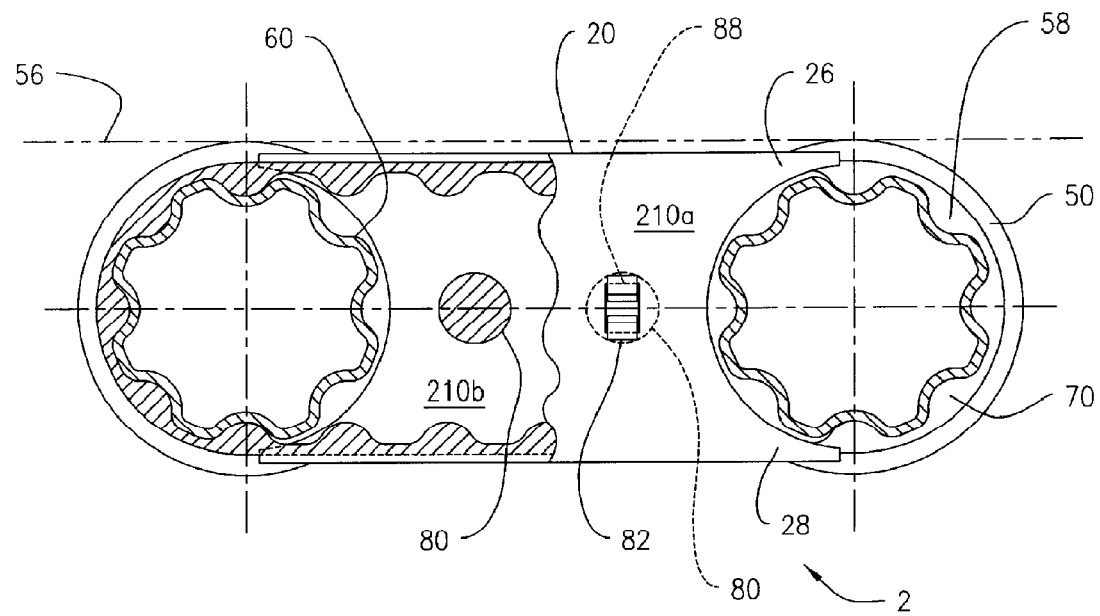
FIG. 5 is a cross sectional elevation view of the conveyor rollers also taken through line 3-3 of FIG. 2, showing the drive belt and belt guard device of FIG. 4.
Figure 4:
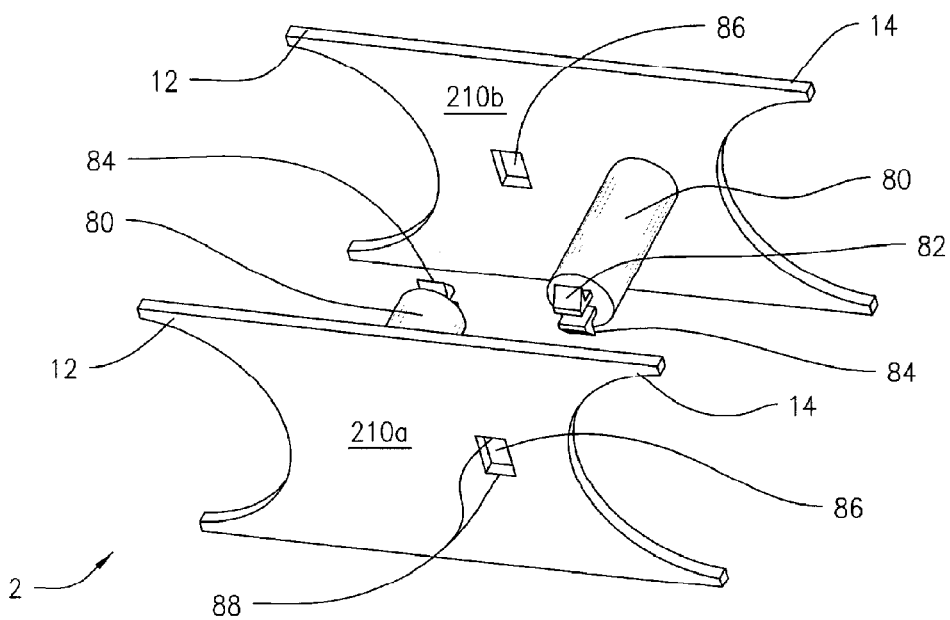
FIG. 4 is a perspective view of a second embodiment of a belt guard device and assembly of the present invention.

In a second embodiment of the invention shown in FIGS. 4 and 5, a belt guard device 210 can be positioned on each side of the drive belt 70, and the two guards 210a and 210b can be affixed together into a belt guard assembly. As shown in FIG. 4, each guards 210a and 210b further comprises a means to affix one guard member to the second guard member, illustrated as a support post 80 extending from one face of the guard 210. The post 80 is shown to extend from a location intermediate between the center of the guard and the end 12 or 14. The distal end of the support post has a pair of prongs 82 in confronting relation, each prong 82 having a latch 84 on the outside of the length of the prong 82. Each prong is made of a resilient material, which allows the prongs to be flexed by force toward each other, but which bias back to the illustrated position when the force is removed. Each guard also has an opening 86 in the face of the guard, disposed in a location intermediate the center of the guard and the end. The opening 86 has opposed edges 88 that serve as catches for the latches 84. The support post 80 and the opening 86 are the same distance from the center of the guard, so that when two guards are positioned face-to-face, as shown in FIG. 4, the support prongs 82 on the post 80 of one guard 210a will register with and engage the opening 86 in the other guard 210b, and visa versa. FIG. 5 shows how the belt guard assembly 2 would appear when positioned on both sides of the drive belt 70, viewed from line 3-3 of FIG. 3.

The belt guard assembly 2 shown in FIG. 4 can be assembled by placing the opposed guards 210a and 210b on either side of the drive belt 70, so that the prongs 82 register with the opposite opening 86, and then pressing the two guards 210 together so that the latches 84 engage and secure the opposed catches 88. The prongs 82 extend through the opening 86 in the opposite guard a distance sufficient that they can be manipulated. The two guards can be separated apart by grasping the prongs 84 that extend outward from the opposite faces of the both guards 210, and pinching them together by force to disengage the latches 84 from the catches 88 of the openings 86.

Figure 6:
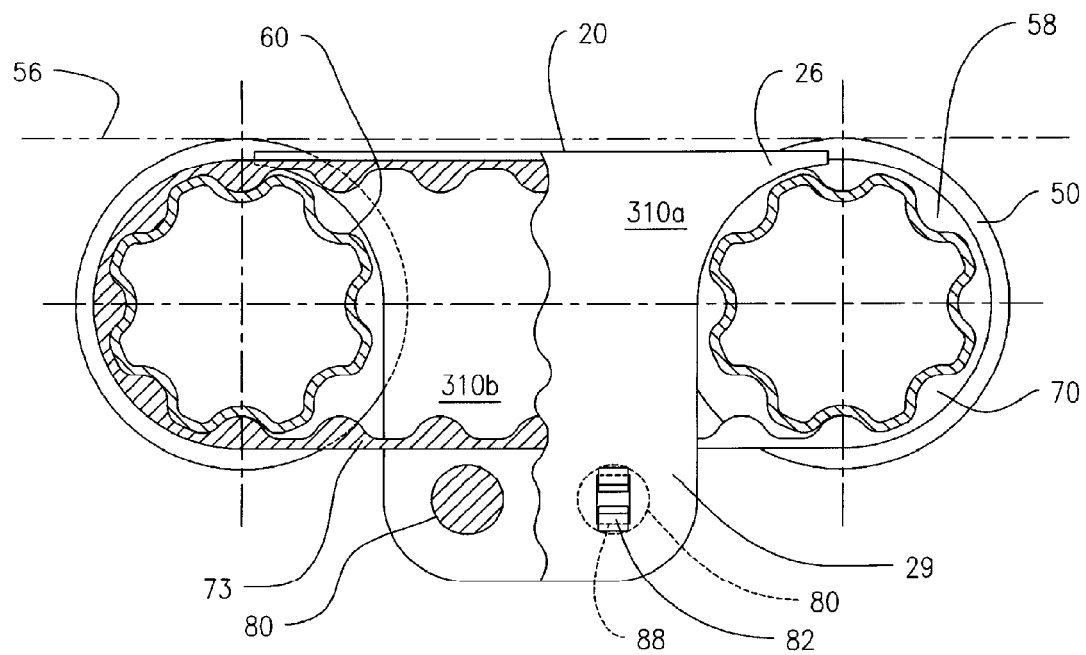
FIG. 6 is a cross-sectional view of the conveyor rollers also taken through line 3-3 of FIG. 3, using a third embodiment of a belt guard device and assembly.

In a third alternative embodiment as shown in FIG. 6, the separate positioning means, illustrated as the support posts 80 and openings 88 used to secure the two guards 310a and 310b, can be disposed on a downward-depending portion 29 of the guard, for positioning below the lower strand 73 of the belt 70. The illustrated embodiment also shows that the guard 310 can be configured with only upper arms 26, and without lower arms. In the illustrated embodiment, the upper arm provides both positioning of the guard 310 in registry with the rollers, as well as protection of the nip area 75 (shown in FIG. 3). Generally, the nip area associated with the lower strand 73 of the belt is not a significant safety risk, since it is disposed below the rollers and generally out of reach. As illustrated, the support posts 80a and 80b are disposed just below the lower strand 73 of the belt, to help position the guards 310 and prevent movement of the guards 310 and the guard assembly 2 (as shown in FIG. 4) in an upward direction by restrictive contact with the lower strand 73.

Figure 7:
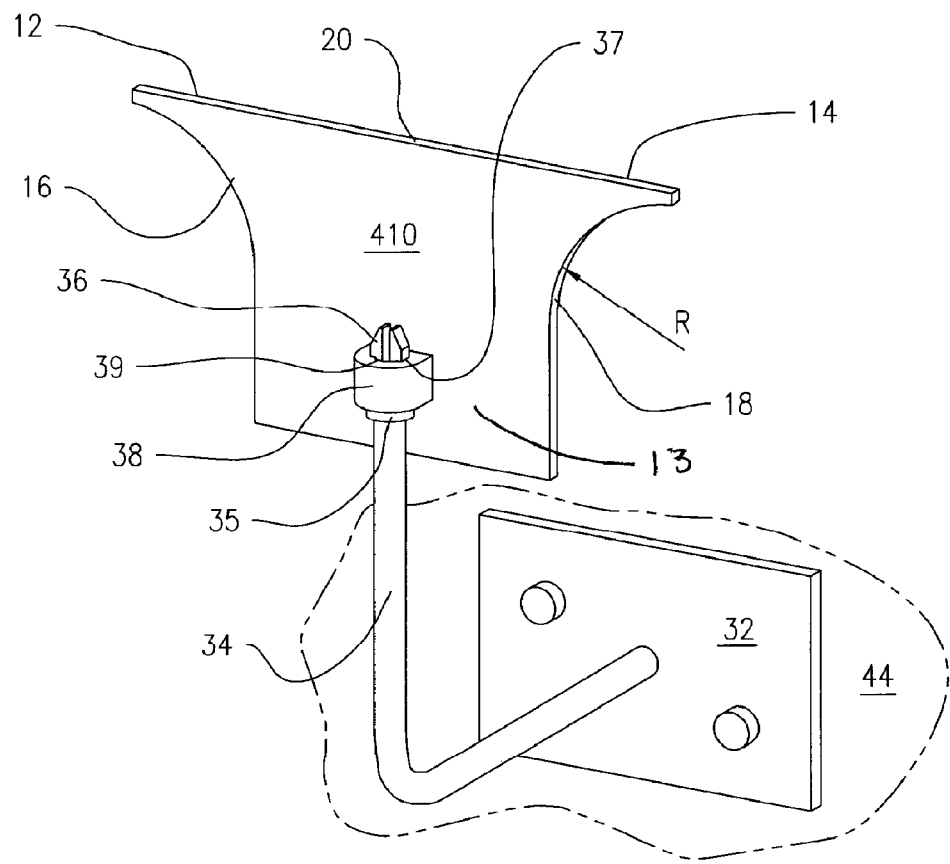
FIG. 7 is a perspective view of a fourth embodiment of a belt guard device of the present invention, with a means for positioning the belt guard.

In a fourth embodiment of the present invention shown in FIG. 7, the positioning means for the belt guard 410 can comprise an extending member that secures the guard to a fixed structure, such as the frame of the conveyor. The extending member can be configured for securement to the roller conveyor assembly, and can be affixed to the guard to position it adjacent to the drive belt and nip area. The belt guard 410 can be affixed to a support arm 34 that is secured to a structural member 44 of the conveyor system, such as a frame member 42 (shown in FIG. 2) or other structural member. The support arm 34 can be affixed to a base 32 that is secured to the conveyor body 44 with a securing means, such as with screws, adhesive, bolts, a pocket, and others. The distal end of the support arm comprises a securement means, illustrated as a set of prongs 36. Affixed to the face 13 of the guard 410 is a socket 38 having a vertical opening, the upper edge of which forms a catch 39 that can engage the latches 37 of the prongs when the prongs 36 are inserted upward and through the opening in the socket 38. The guard 410 is secured in a position vertically between a stationary collar 35 on the support arm 34 and the prongs 36. The support arm and securement, and the guard and socket are configured to position the guard adjacent the inside or outside of the drive belt.

Figure 8:
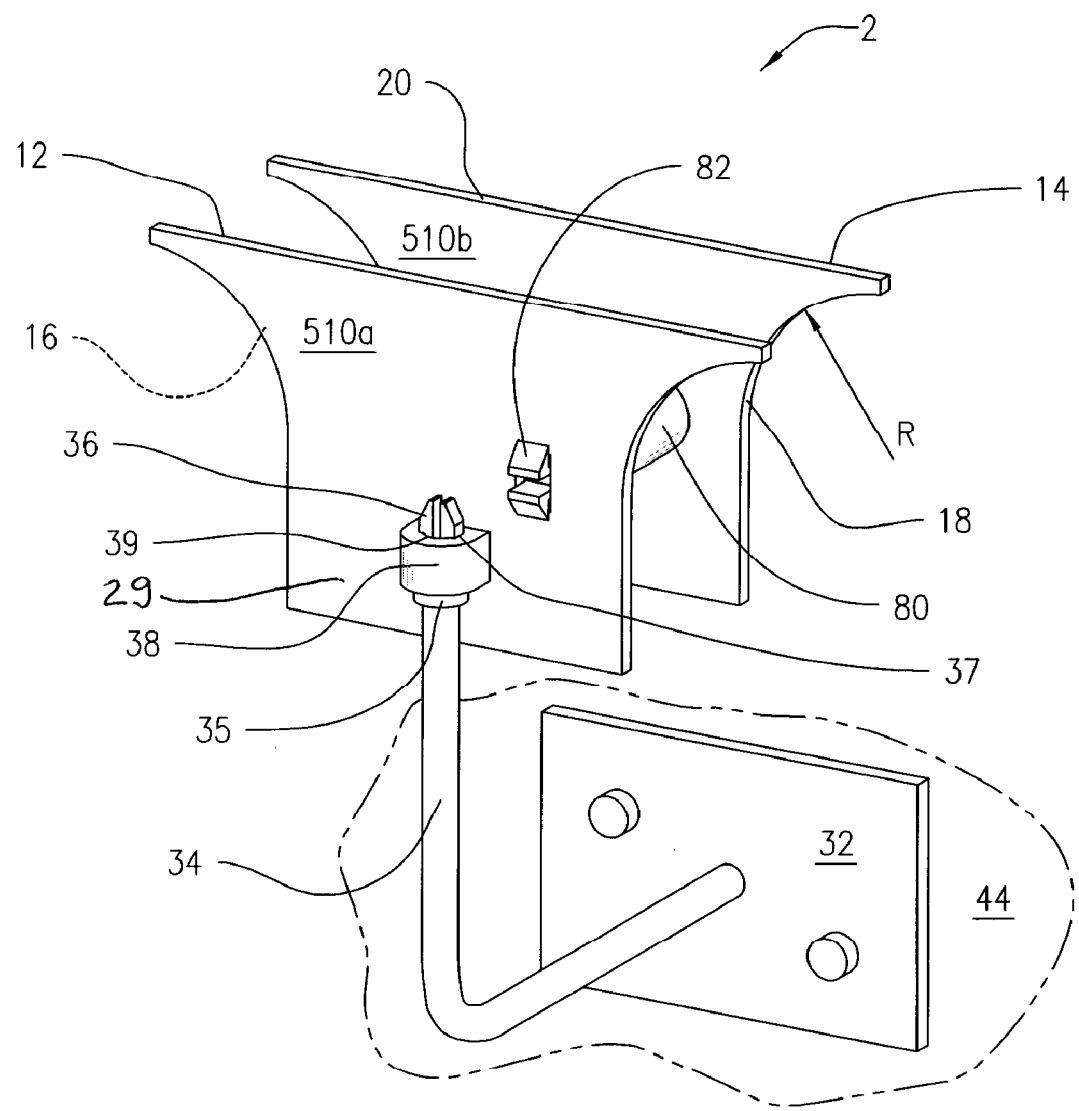
FIG. 8 is a perspective view of a fifth embodiment of a belt guard device and assembly of the present invention, with a means for positioning the belt guard assembly.

In a fifth embodiment shown in FIG. 8, a belt guard assembly having the two guards 510*a* and 510*b* fixed together and adjacent opposite sides of the belt, can be positioned by the extending member positioning means. The first guard 510*a* is affixed to the support arm 34 as described above. The second guard 510*b* can be position and affixed to the first guard 510*a*, to form the guard assembly 2, using the support post affixment means as described above for the second embodiment shown in FIGS. 4 and 5. It can be understood that the support post affixment means can also be positioned on a portion 29 of the guards 510*a* and 510*b* that extends below the lower strand 73 of the belt, as shown in and described for the third embodiment shown in FIG. 6.

Figure 11:
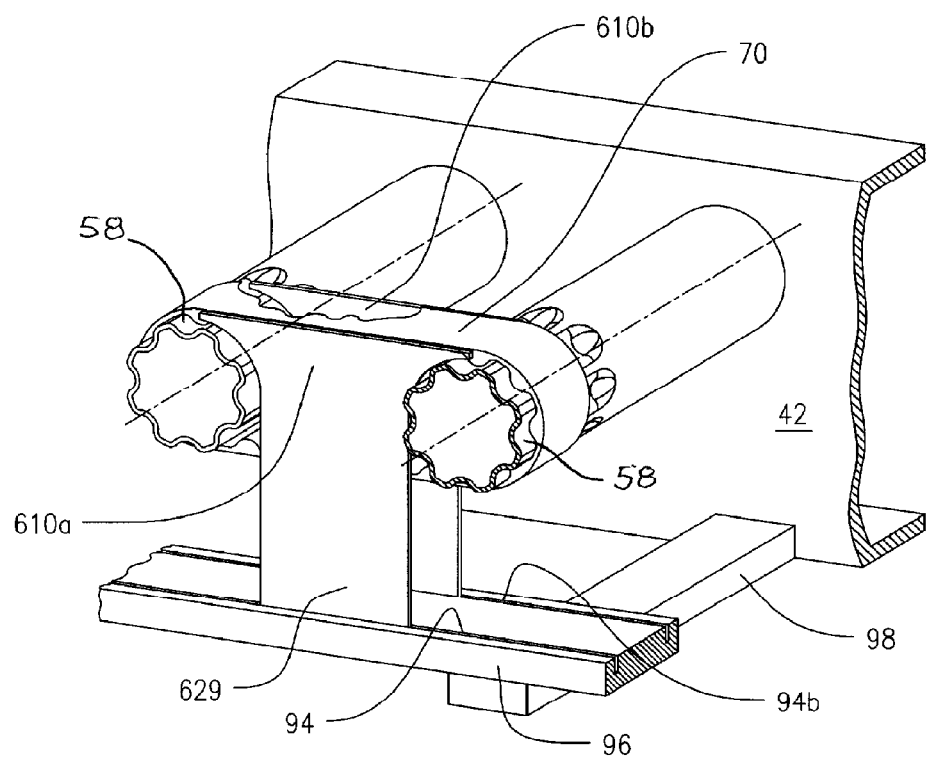
FIG. 11 shows a sixth embodiment of a belt guard device and assembly of the present invention.

A sixth embodiment of the invention is shown in FIG. 11, wherein a belt guard device 610 has a depending portion 629 that engages a groove 94 in a track 96 to hold the belt guard 610 in position adjacent to the side of the belt 70. Typically the track 96 is positioned below the plurality of drive portions 58. Each track 96 has at least one groove. The illustrated embodiment shows a pair of grooves 94 and 94*b*, spaced apart a distance to hold a pair of belt guards 610*a* and 610*b* on opposed sides of the drive belt 70. The upper portion of the belt guard is shaped similarly to that of device 410. The lower portion typically has a rectangular lower edge of a selected material thickness that is insertable into the groove 94 of selected width, with sufficient frictional interference to hold and retain the guard devices 610*a* and 610*b* in position during conveyor operation. Other equivalent and well known means can be used to position and secure the guard devices can be used. The track 96 is supported from the conveyor structure 42 by a bracket 98 or other well known support means.

Figure 12B:
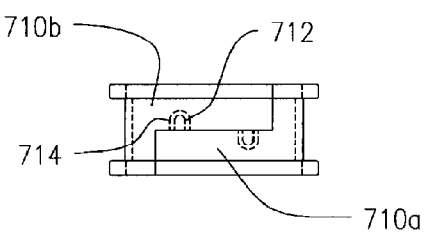
FIGS. 12A, 12B and 12C show front, top, and side views of a seventh embodiment of a belt guard device and assembly of the present invention.
Figure 12A:
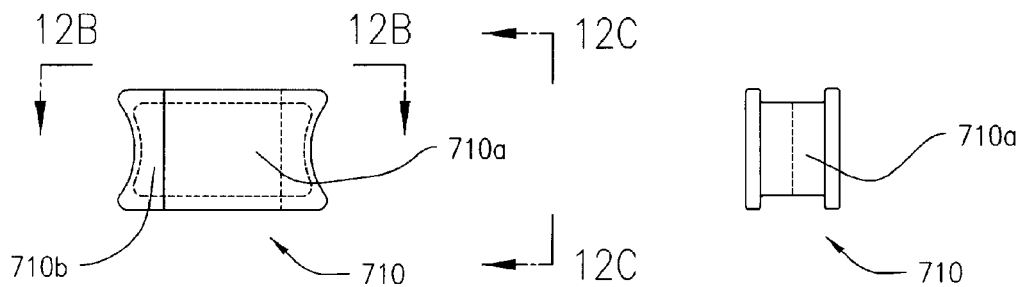
Figure 12C:
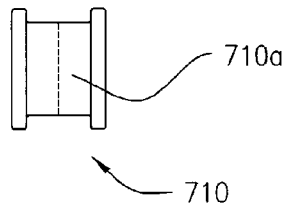

A seventh embodiment of the belt guard device 710 is shown in FIGS. 12A, 12B and 12C. This device 710 is similar to the second embodiment device 210, but differs in having two shells 710*a* and 710*b* that when pieced together form a solid surfaces device 710 with a hollow interior. The two shells 710*a* and 710*b* have respective pins 712 that snap or frictionally fit into corresponding receiving holes 714 to hold the pieces together. Other equivalent and well known means can be used to position and secure the two shells can be used. The cooperating profile between the two pieces, shown in FIG. 12A as an upright "Z" shape can also be formed as a horizontal, diagonal or curvilinear profile.

The belt guard devices described herein can be made of a thermoplastic material or other suitable engineering material, including light weight aluminum. Non-limiting examples of thermoplastics including but not limited to acrylonitrile-butadiene-styrene (ABS), nylon, polycarbonate (available as Lexan® from GE Plastics), acrylic-styrene-acrylonitrile (ASA), and polybutylene terephthalate (PBT). The type of material and the thickness of the planar material are selected to provide sufficient rigidity and resilience to the belt guard so that it maintains shape under ordinary use conditions. The material should also be selected to avoid rapid belt wear caused by the rotating rollers and drive belt. The concave portion of a planar belt guard device, such as in the first through sixth embodiments, is typically curvilinear, but can comprise one or more linear segments.

The belt guard devices preferably have a positioning means for retaining the ends of the belt guard in registration with the drive portions of the conveyor rollers. The positioning means can be integral with the belt guard as described herein, to allow the belt guard to contact the rotating drive portion (during operation of the roller) without inhibiting the rotation of the conveyor roller or the movement of the drive belt. The positioning means can be a separate element, configured to hold the belt guard in a stationary position out of direct contact with the drive portion of the conveyor, as shown in FIG. 7.

Figure 13:
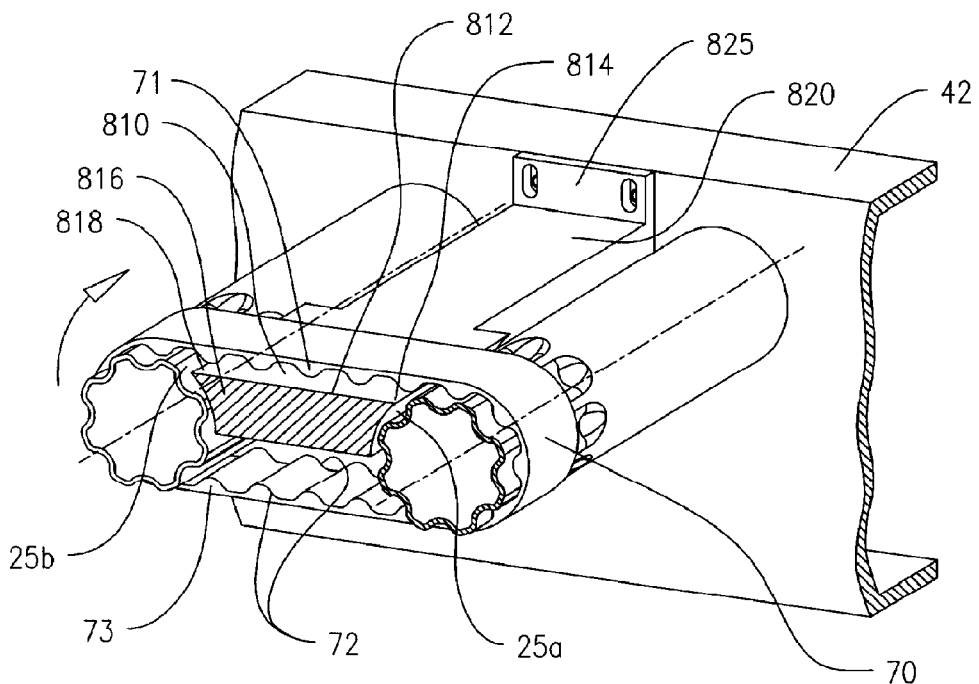
FIG. 13 shows of an alternative embodiment of a nip guard means of the present invention, which extends into both nip areas of the drive belt from the conveyor support structure.

An alternative embodiment of the nip guard means is shown as nip guard 810 in FIG. 13. The device 810 is supported in position with a bracket 825 and support arm 820, as a means of support and positioning. The nip guard 810 extends at least between the upper strand 71 and lower strand 73 of the belt 70, and typically extends beyond the inner and outer side edges 72 of the belt. The nip guard 810 has a first side edge 812 that has an outwardly tapering tip 814 that extends toward and along the first nip area. The nip guard 810 is shown with an optional second side edge 816 that also has an outwardly tapering tip 818 that extends toward and along the second nip area. Although the risk of having an exogenous object pulled into a nip only relates to the nip area where the belt is advancing, roller conveyors can be configured to operate in both directions, such that a reversing of the direction of the belt shifts the risk to the other nip area.

Figure 14:
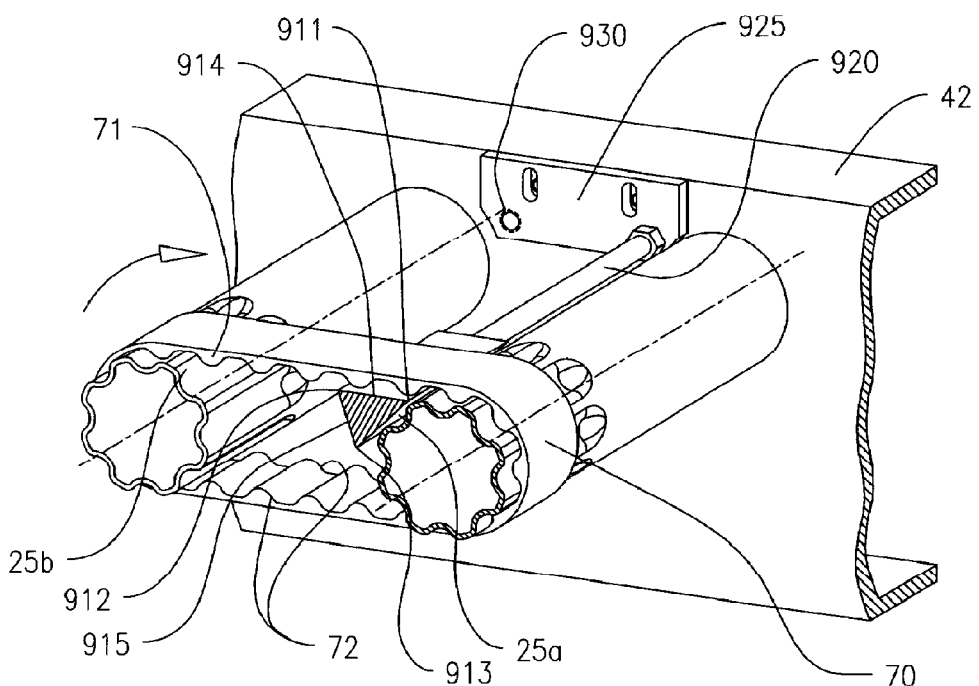
FIG. 14 shows another alternative embodiment of a nip guard means of the present invention, which extends into the nip area from the conveyor support structure.

Another alternative embodiment of the nip guard means is shown as nip guard 910 in FIG. 14. The nip guard 910 extends along the first nip area, and extends beyond the inner and outer side edges 72 of the belt 70. The nip guard 910 extends from a support arm 920 affixed to a bracket 925 that can be secured by threads or other securement means to the conveying structure 42, as a means of support and positioning. The nip guard 910 is shown having an elongated triangular shape, wherein a first corner 911 extends toward the first nip 25*a*, and an adjacent side 914 and second corner 912 of the triangular shape extend along the upper strand 71 of the belt 70 and only partly toward the second nip 25*b*. The sloped second side 915 of the nip guard 910 serves to deflect downward any exogenous object contacting the guard, away from a secondary nip that is itself formed between the upper strand 71 of the belt and the nip guard 910. The nip guard 910*b* can also be made with other elongated shapes, such as oval and circular cross section, and can be affixed at the second securing position 930 to guard the second nip area 25*b*.

FIGS. 9 and 10 illustrate the belt guard device 10 used with belt-driven conveyor rollers employed in a curved roller conveyor section, such as the curved roller conveyor employing powered conveying rollers disclosed in US Publication 2006/0096842, published on May 11, 2006, the disclosure of which is incorporated herein by reference. In the illustrated embodiment, each conveyor roller is configured with a pair of (an inside 58*a* and an outside 58*b*) tapered spline drive portions. Each inside tapered spline portion 58*a* in adjacent rollers are joined with an inner drive belt 70*a*, while the outside tapered spline portions 58*b* in adjacent rollers are joined with a drive belt 70*b*. Typically, the length of drive belts 70*a* and 70*b* are the same. Consequently, adjacent rollers joined by inside belts 70*a* are spaced closer together (a small angle there between) than that of the adjacent rollers joined by outside belts 70b. However, as can be seen in FIG. 10, the distance between adjacent drive portions at the inside (radially) of the drive belt 70 is less than that at the outside of the drive belt, such that the inside belt guard 10b is shorter in length than the outside belt guard 10a. The second through ninth embodiments of the belt drive device and assemblies can also be used on the curved roller conveyor section.

While specific embodiments of the apparatus of the present invention have been described, it will be apparent to those skilled in the art that various modifications thereto can be made without departing from the spirit and scope of the present invention as defined in the appended claims.

We claim:

1. A belt guard for use with a drive belt that is in driving contact between respective drive portions of a pair of adjacent, rotating cylindrical conveyor rollers, the belt guard including an upper edge and opposed first and second ends, each first and second end having a concave portion configured for interference-free and confronting orientation with said drive portions, and an upper arm extending from both the first and second ends for engaging an upper part of said drive portion proximate a nip between the roller and the drive belt, for retaining the belt guard in the confronting orientation with said drive portions.

2. The belt guard according to claim 1 wherein the belt guard is a planar thermoplastic material.

3. The belt guard according to claim 1 further including a lower arm extending from both the first and second ends for engaging a lower part of said drive portions.

4. The belt guard according to claim 1, further including a separate positioning support for positioning and supporting the belt guard, having a first end affixed to a structure of the roller conveyor, and a second end affixed to the belt guard.

5. The belt guard according to claim 1 wherein the belt guard includes a first belt guard disposed on a first side of the drive belt, and a second belt guard affixed to the first belt guard and disposed on the opposed second side of the drive belt.

6. A roller conveying system comprising:
 a plurality of spaced-apart cylindrical rollers, each roller having a tubular conveying portion having a first radius, and at least one drive portion having an outermost surface of a second radius smaller than the first radius, and wherein the upper peripheries of the conveying portions of adjacent rotatable rollers form a conveying surface;
 a plurality of drive belts, each belt in driving contact with the respective drive portions of a pair of adjacent rollers to define a first nip area and a second nip area; and
 a plurality of nip guard means, each nip guard means positioned proximate at least one of the first nip area and the second nip area, and configured so that no part of the nip guard means extends above the conveying surface proximate the drive portions of the pair of adjacent rollers.

7. The roller conveying system according to claim 6 wherein the plurality of nip guard means comprise a plurality of belt guards, each belt guard positioned adjacent a side of the drive belt and between adjacent conveyor rollers, and each belt guard comprising an upper edge disposed below the conveying surface, and opposed first and second ends, each first and second end configured for confronting orientation with the drive portions.

8. The roller conveying system according to claim 7 wherein the belt guard is a planar thermoplastic material.

9. The roller conveying system according to claim 8 further comprising a positioning means for retaining the belt guard in the confronting orientation position with said drive portions.

10. The roller conveying system according to claim 9 wherein the positioning means comprises at least an upper arm extending from the guard end, configured to engage an upper part of the drive portion of the roller proximate the nip between the roller and the drive belt.

11. The roller conveying system according to claim 9 wherein the positioning means comprises a separate positioning support for positioning and supporting the belt guard, having a first end affixed to a structure of the roller conveyor, and a second end affixed to the belt guard.

12. The roller conveying system according to claim 7 wherein the upper edge is configured to be disposed within the upper surface of the drive belt.

13. The roller conveying system according to claim 7 further comprising a second belt guard disposed on a second side of the drive belt.

14. The roller conveying system according to claim 13 wherein belt guards on opposed sides of the drive belt are affixable together.

15. The roller conveying system according to claim 6, wherein the nip guard means comprises an elongated nip guard extending between an upper strand and a lower strand of the drive belt, and along at least the first nip area.

16. The roller conveying system according to claim 15, wherein the nip guard has a first side edge having an outwardly tapering tip extending toward the first nip area.

17. The roller conveying system according to claim 16, wherein the nip guard has a second side edge having an outwardly tapering tip extending toward the second nip area.

18. The roller conveying system according to claim 15, wherein the nip guard means comprises a second elongated nip guard extending between the upper strand and the lower strand of the drive belt, and along the second nip area.

19. A nip guard system for use in a roller conveying system that includes a plurality of spaced-apart rotating cylindrical rollers, comprising at least a pair of adjacent rollers, each roller having a tubular conveying portion having a periphery defined by a first radius, and at least one drive portion having an outermost surface of a second radius less than the first radius, and wherein an upper portion of the peripheries of the conveying portions of the pair of adjacent rollers forms a conveying surface; and a plurality of drive belts, each of the plurality of drive belts in driving contact with the drive portions of the pair of adjacent rollers and forming a nip where the drive belt advances onto the drive portion, the nip guard system comprising a plurality of nip guard means that obstruct access by an exogenous object to the plurality of nips.

* * * * *